United States Patent
Maley et al.

[15] 3,656,117
[45] Apr. 11, 1972

[54] TERNARY READ-ONLY MEMORY

[72] Inventors: Gerald A. Maley, Fishkill; James L. Walsh, Hyde Park, both of N.Y.

[73] Assignee: International Business Machines Corporation, Armonk, N.Y.

[22] Filed: Feb. 5, 1971

[21] Appl. No.: 112,934

[52] U.S. Cl. .......... 340/173 SP, 307/238
[51] Int. Cl. .......... G11c 17/00, G11c 11/40
[58] Field of Search .......... 340/174 SP, 173 SP, 173 R; 307/238

[56] References Cited

UNITED STATES PATENTS

| | | | |
|---|---|---|---|
| 2,998,594 | 8/1961 | Jones | 340/174 R |
| 3,253,267 | 5/1966 | Ishidate | 340/173 SP |
| 3,355,726 | 11/1967 | Koerner | 340/174 R |

*Primary Examiner*—Stanley M. Urynowicz, Jr.
*Attorney*—Hanifin & Jancin and Martin G. Reiffin

[57] ABSTRACT

A ternary read-only memory comprises a matrix of transistors arranged in rows and columns. A plurality of bit lines are each connected to the transistors of a respective one of the columns. Connected to the emitter of each transistor is an impedance which may be either a diode, a conductive shunt or an open circuit. A word amplifier is connected to each row of transistors. Means are provided for energizing one of the bit lines and one of the word amplifiers so as to select one transistor for reading out. Each word amplifier includes means for generating a ternary logic function depending upon the value of the impedance connected to the emitter of the transistor selected by energization of the respective bit line and word amplifiers.

16 Claims, 2 Drawing Figures

INVENTORS
GERALD A. MALEY
JAMES L. WALSH
BY Martin G. Reiffin
ATTORNEY

TERNARY READ-ONLY MEMORY

BACKGROUND OF THE INVENTION

1. Field of the Invention

The present invention relates to ternary algebra; that is, to an algebra wherein the variables may take on any one of three values, as distinguished from merely the two values of Boolean or binary algebra.

In the binary technology there are monolithic read-only memories where the information is stored by the presence or absence of a wire. An analogous technique may be used to provide the ternary memory cells embodying the present invention.

2. Description of the Prior Art

In the prior art read-only memories are generally embodied in binary or two-valued circuits. In the monolithic form a large number of transistors constituting a master slice are diffused in a silicon block without connections. Metal leads are then deposited on the silicon block so as to provide interconnections of the transistors in the manner dictated by the read-only memory information to be stored. Since there are only two values for each variable in the binary system the value of each bit may be determined by the presence or absence of a connecting wire. However, in a ternary system the variables may have any one of three values, and the prior art technique of providing for the presence or absence of a wire cannot be employed in the ternary system. Instead, the present invention in the preferred embodiment disclosed herein utilizes either a diode, or a conductive shunt or an open circuit to determine the value of the ternary digit.

SUMMARY OF THE INVENTION

It is therefore a primary object of the present invention to provide in a ternary or three-valued logic system a read-only memory wherein the value of each digit is determined by the value of the impedance connected to each digit structure in the master slice. The impedance selected may be either a diode or a conductive shunt or an open circuit. The value of the impedance selected determines the value of the current flowing through a load impedance. If no current flows through the load impedance, corresponding to the case where a conductive shunt is selected as the impedance connected to the transistor, then the value at the output of the circuit will be a ternary 2; that is, at the highest potential of the three available levels. If one unit of current flows through the load impedance, corresponding to the case where a diode is the selected impedance connected to the transistor, then the output of the circuit will be at the intermediate voltage level or a 1 in the ternary logic system. If two units of current flow through the load resistor, corresponding to the case where the impedance selected is an open circuit, then the output will be at the lowermost of the three available levels, or a 0 in the ternary logic system.

DESCRIPTION OF THE PREFERRED EMBODIMENTS

Figure 1:
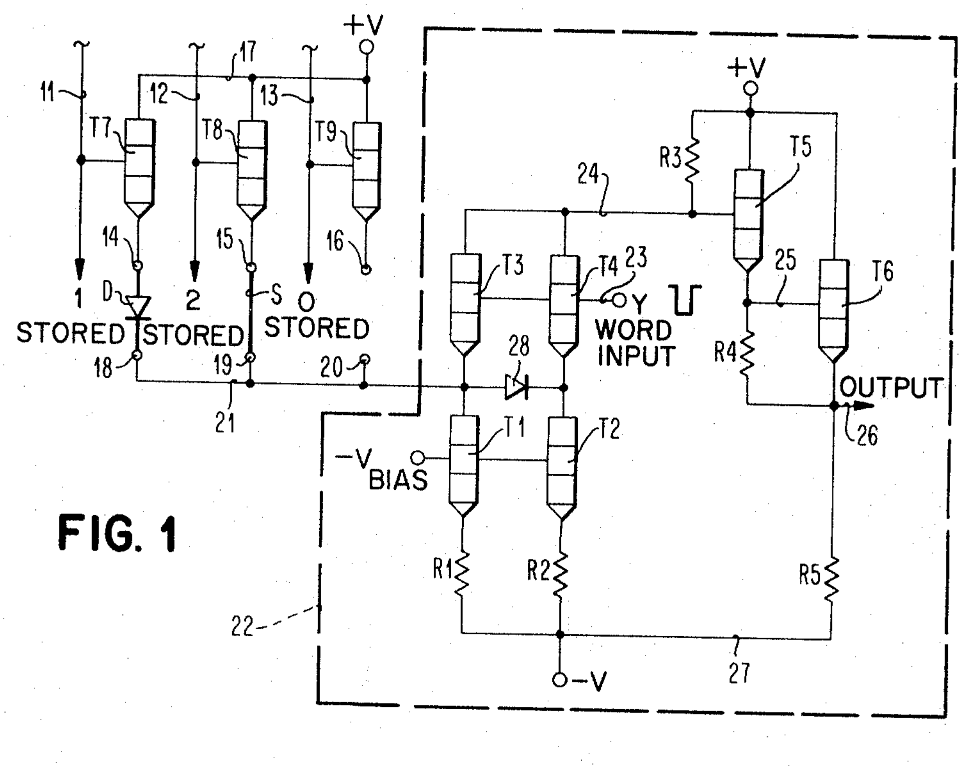
FIG. 1 is a circuit diagram showing one embodiment of the invention.

Referring now to the drawing in more detail, there is provided an array or matrix of transistors of which only three transistors of a row are shown and designated at T7, T8, and T9. A bit line is connected to the bases of each column of transistors as indicated at 11, 12, and 13. The collectors of transistors T7, T8, T9 are connected to a lead 17 in turn connected to a power supply indicated at +V. The emitters of transistors T7, T8, and T9 are connected respectively to nodes 14, 15 and 16. Corresponding to the latter are nodes 18, 19, 20 respectively.

Adapted to be connected between each pair of nodes is any selected one of three impedances comprising a diode D or a conductive shunt S, or an infinite impedance provided by an open circuit. Each of the nodes 18, 19, or 20 is in turn connected to a lead 21.

Each row of the matrix is provided with a word amplifier indicated generally by the reference numeral 22 and enclosed within the dashed lines. The word amplifier 22 comprises a pair of transistors T3, T4 having a base connected to the word input indicated at 23. The collectors of transistors T3, T4 are connected by lead 24 to the base of a transistor T5 and to the lower end of a load resistor R3. The collector of transistor T5 and the upper end of resistor 3 are connected to a potential +V. The emitter of transistor T5 is connected by lead 25 to the base of a transistor T6. A resistor R4 extends from the emitter of transistor T5 to the emitter of transistor T6 at which junction there is provided the output indicated at 26. A resistor R5 extends from the emitter of transistor T 6 to lead 27 in turn connected to a potential source −V.

Lead 21 is connected to the emitter of transistor T3. A diode 28 is connected between the emitter of transistor T3 and the emitter of transistor T4. Also connected to the emitter of transistor T3 is the collector of a transistor T1 having its base connected to a bias source $-V_{bias}$. A resistor R1 extends from the emitter of transistor T1 to the lead 27.

A transistor T2 is provided with its base also connected to the bias source $-V_{bias}$. The collector of transistor T2 is connected to the emitter of transistor T4. A resistor R2 extends from the emitter of transistor T2 to the lead 27.

If it is desired to store a 1 in a particular ternary digit position then a diode is placed between the appropriate terminals as shown at 14,18 in FIG. 1. If it is desired to store a 2 then a conductive shunt is connected as shown by the shunt S connected between the terminals 15,19. If it is desired to store a 0 then nothing is connected between the terminals as shown at terminals 16,20 so as to provide an open circuit thereacross.

The bit inputs at 11,12,13 and the word input at 23 always switch between 0 and 2. The word input 23 is normally at the 2 level and when energized for selection drops down to the 0 level. Assuming that transistor T7 is selected by switching the bit input 11 and the word input 23, transistor T3 will shut off and one unit of current flows from transistor T1 through diode D and transistor T7. The other unit of current flows from transistor T2 through transistor T4 and load resistor R3. The signal at output 26 will then be a 1.

If transistor T8 is selected the shunt S pulls the emitters of transistors T3 and T4 sufficiently high to cut them off so that both units of current (one from T1 and one through diode 28 and T2) flow through transistor T8 and no current flows through the load resistor R3. Lead 24 and hence output 26 will then be at their uppermost levels to designate a 2 at output 26.

If transistor T9 is selected then both transistors T3 and T4 are on so that the current for both transistors T1 and T2 flows through load resistor R3, thereby providing a 0 at line 24 and at output 26.

Figure 2:
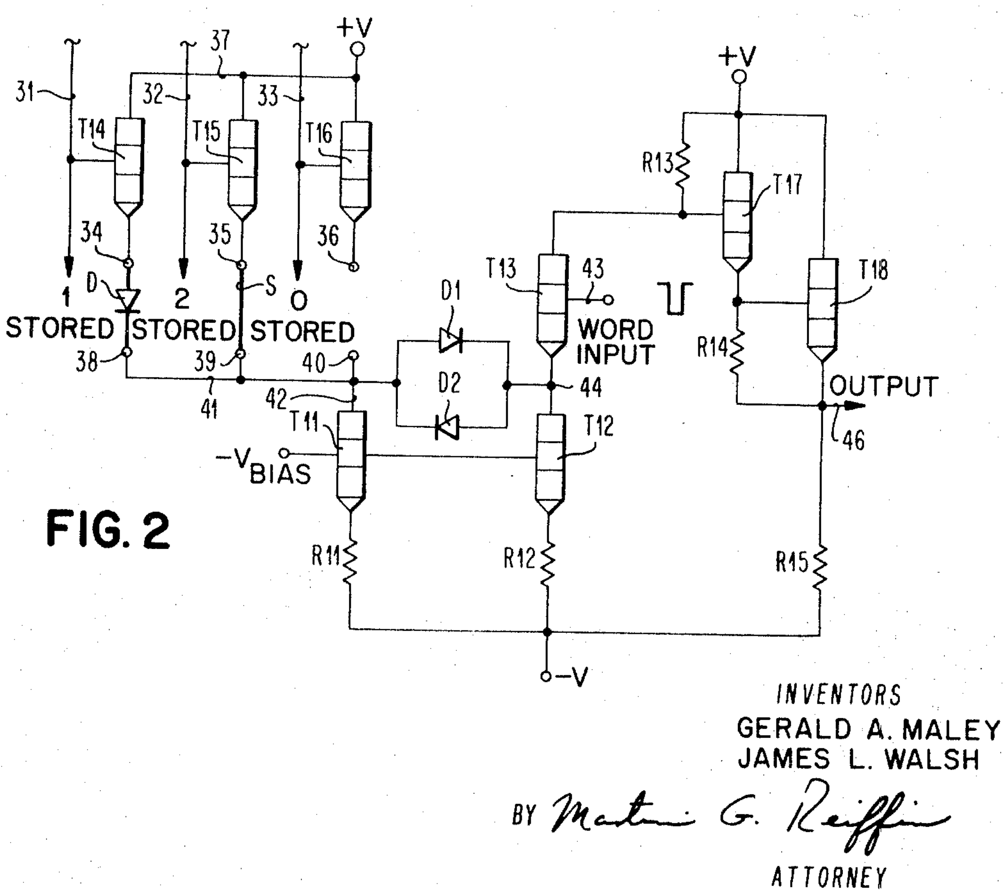
FIG. 2 is a circuit diagram of another embodiment of the invention.

Referring now to FIG. 2, there is shown a modified form of the invention. The matrix of transistors is represented by T14,T15, and T16 having connected to their respective bases the bit input lines 31,32, 33. The emitters of the transistors are connected respectively to nodes 34,35,36. A diode D extends between nodes 34 and 38, whereas an open circuit extends between the nodes 36,40.

Nodes 38,39,40 are connected to lead 41 in turn connected by lead 42 to the collector of a transistor T11. Its base is biased by source $-V_B$ in turn also connected to the base of transistor T12. Diodes D1 and D2 are arranged in parallel between the collectors of transistors T11 and T12. The junction or node 44 is connected to the emitter of transistor T13 having as its base the word input line 43. The collector of transistor T13 is connected to the lower end of a load resistor R13 having its upper end connected to the potential source +V. The lower end of load resistor R13 is connected to the base of transistor T17 having its emitter connected to the base of transistor T18. A resistor R14 extends from the base of transistor T18 to its emitter and from the latter extends a resistor R15 to the potential source —V. The output is taken at line 46.

As described above with respect to FIG. 1, selection of transistor T14 having the diode D in its emitter circuit results in an output of 1 at the output line 46. Selection of transistor T15 with a shunt S in its emitter circuit results in an output of 2 at output line 46. Selection of transistor T16 having an open circuit in its emitter results in an output of 0 at output line 46. This mode of operation is achieved in a manner similar to that described in respect to FIG. 1 in that there is caused to flow through load resistor R13 either one, none or two units of current, depending on the value of the impedance in the emitter circuit of transistors T14, T15 and T16.

If bit line 31 is energized to a 2 level to select transistor T14 and if the word input is energized to a 0 level, one unit of current will flow through transistor T14 to diode D to transistor T11. One unit of current will flow from R13 to transistor T13 to transistor T12. No current flows through diodes D1 and D2. Since one unit of current flows in R13 the output will be at a 1 level.

If bit line 32 is energized to a 2 level to select transistor T15 and the word input is energized to a 0 level, two units of current will flow through transistor T15, one unit to transistor T11 and one unit through diode D1 to transistor T12. Transistor T13 is off and since no current flows through R13 the output at line 46 will be at a 2 level.

If bit line 33 is energized to a 2 level to select transistor T16 and the word input is energized to a 0 level, two units of current will flow through R13, one unit directly to transistor T12 and one unit through diode D2 to transistor T11. Because two units of current flow through R13 the output at line 46 will be at a 0 level.

It is to be understood that the specific embodiments disclosed herein are merely illustrative of two of the many forms of the invention which may occur in practice and that numerous modifications thereof will readily occur to those skilled in the art without departing from the scope of the invention as delineated by the appended claims which are to be construed as broadly as permitted by the prior art.

We claim:

1. A ternary read-only memory comprising a plurality of active devices each having a pair of terminals,
a plurality of bit signal lines each connected to one terminal of a respective one of said devices for selecting the latter upon energization of a respective bit line,
means for connecting to the other terminal of each of said devices any one of three different impedances, and
means for generating a ternary signal at any one of three different voltage levels depending upon the impedance connected to said other terminal of the selected device.

2. A ternary read-only memory as recited in claim 1 wherein said three impedances comprise respectively
a diode, a conductive shunt, and an open circuit.

3. A ternary read-only memory as recited in claim 1 wherein said devices are transistors having bases and emitters,
said one terminal being the respective base of each transistor,
said other terminal being the respective emitter of each transistor.

4. A ternary read-only memory as recited in claim 1 and comprising
a plurality of rows of said active devices, and
a word amplifier for each of said rows.

5. A ternary read-only memory as recited in claim 4 wherein said word amplifier comprises said generating means,
the latter comprising a pair of current sources,
a load impedance, and
means for causing to flow through said load impedance the current of either none, or one or both of said current sources depending upon the impedance connected to said other terminal of the selected device.

6. A ternary read-only memory as recited in claim 5 wherein said three impedances comprise respectively a diode, a conductive shunt, and an open circuit.

7. A ternary read-only memory as recited in claim 6 wherein said devices are transistors each having a base and an emitter,
said one terminal being the respective base of each transistor,
said other terminal being the respective emitter of each transistor.

8. A ternary read-only memory comprising
a matrix of transistors arranged in rows and columns,
a plurality of bit lines each connected to the transistors of a respective one of said columns,
an impedance connected to each one of said transistors,
said impedance having any selected one of three values,
a plurality of word amplifiers each connected to a respective row of transistors,
means for energizing one of said bit lines and one of said word amplifiers to select one of said transistors,
each word amplifier including means for generating a ternary logic function depending upon the value of the impedance connected to the transistor selected by energization of the respective bit line and word amplifier.

9. A ternary read-only memory as recited in claim 8 wherein said three impedances comprise a diode, a conductive shunt, and an open circuit.

10. A ternary read-only memory as recited in claim 8 wherein
each of said transistors has a base,
each of said bit lines being connected to the bases of the transistors of the respective column.

11. A ternary read-only memory as recited in claim 10 wherein
each of said transistors has an emitter,
each of said emitters being connected to one end of one of said impedances.

12. A ternary read-only memory as recited in claim 11 wherein
the opposite end of each of said impedances is connected to one of said word amplifiers.

13. A ternary read-only memory as recited in claim 8 wherein said generating means comprises
a pair of current sources,
a load resistor, and
means for causing to flow through said load resistor the current of either none, one or both of said current sources depending upon the value of the impedance connected to the selected transistor.

14. A ternary read-only memory as recited in claim 13 wherein
each of said transistors has a base,
each of said bit lines being connected to the bases of the transistors of the respective column.

15. A ternary read-only memory as recited in claim 14 wherein
each of said transistors has an emitter,
each of said emitters being connected to one end of one of said impedances.

16. A ternary read-only memory as recited in claim 15 wherein
the opposite end of each of said impedances is connected to one of said word amplifiers.

* * * * *